US007679217B2

(12) United States Patent
Dishman et al.

(10) Patent No.: US 7,679,217 B2

(45) Date of Patent: Mar. 16, 2010

(54) APPARATUS, SYSTEM, AND METHOD FOR A HIGH EFFICIENCY REDUNDANT POWER SYSTEM

(75) Inventors: Cecil C. Dishman, Raleigh, NC (US); Eino A. Lindfors, Raleigh, NC (US); Randhir S. Malik, Cary, NC (US); Trung M. Nguyen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 11/966,432

(22) Filed: Dec. 28, 2007

(65) Prior Publication Data

US 2009/0167089 A1 Jul. 2, 2009

(51) Int. Cl.
*H02J 9/00* (2006.01)

(52) U.S. Cl. .......................................... 307/64; 307/87

(58) Field of Classification Search ............. 307/64–68
See application file for complete search history.

(56) References Cited

U.S. PATENT DOCUMENTS 6,747,369 B2 6/2004 Griffith et al. ................. 307/43
6,762,945 B2 * 7/2004 Morgen ....................... 363/17
7,043,648 B2 5/2006 Tokunaga ................... 713/320
7,157,890 B1 1/2007 Kris ........................... 323/272

OTHER PUBLICATIONS

Intelligent Energy Management, GE Digital Energy, pp. 1-3, Sep. 27, 1999.*
White Paper RPA Redundant Parallel Architecture, GE Consumer & Industrial Power Protection, pp. 1-6, Mar. 2005, UPS Product Management.*
Digital Energy SitePro Series UPS, Uninterruptible Power Supply 10-500kVA, GE Consumer & Industrial Power Protection, pp. 1-12, Nov. 2004.*

* cited by examiner

*Primary Examiner*—Fritz M Fleming
(74) *Attorney, Agent, or Firm*—Kunzler & McKenzie

(57) ABSTRACT

An apparatus, system, and method are disclosed for a high efficiency redundant power system. First and second power supplies are connected in parallel to power a load. Each power supply includes a primary stage and a regulator stage. Each primary stage regulates voltage on an internal bus that is input for each regulator stage. Each regulator stage regulates a regulated bus connected to the load. A power meter detects power provided to the load and determines if the provided power is below a predefined power threshold. A regulator control module shuts down the regulator stage of the first power supply after the provided power falls below the predefined power threshold so the second power supply powers the load and the primary stage of the first power supply remains operational. A recovery module starts up the regulator stage of the first power supply after failure of the second power supply.

20 Claims, 4 Drawing Sheets

APPARATUS, SYSTEM, AND METHOD FOR A HIGH EFFICIENCY REDUNDANT POWER SYSTEM

BACKGROUND OF THE INVENTION

1. Field of the Invention

This invention relates to power supplies, and more particularly relates to implementing redundant power supplies for increased efficiency at low power output.

2. Description of the Related Art

A power supply, sometimes known as a power supply unit or PSU, is a device or system that supplies electrical or other types of energy to an output load or group of loads. A power supply, in some embodiments may be configured to convert power in one form to another form, such as converting AC power to DC power. The regulation of power supplies is typically done by incorporating circuitry to tightly control the output voltage or current of the power supply to a specific value. The specific value is closely maintained despite variations in the load presented to the power supply's output, or any reasonable voltage variation at the power supply's input.

For example, in an electrical device such as a computer, the power supply is typically designed to convert an AC voltage input such as is traditionally provided by a conventional wall socket, into several low-voltage DC power outputs for transmission to the internal components of the computer. Conversion is sometimes performed in stages that may include different power supply topologies such as a rectification stage, a boost stage, buck stage, or other topology.

In some cases, two or more power supplies may be operated in parallel to provide redundancy for fault protection and to provide power beyond the full load capacity of a single power supply. In a redundant power system with two power supplies, each power supply typically operates most efficiently when operated near their full load capacity. However, if both power supplies are sharing the load and the load is at full load, each power supply provides only 50%, which is less efficient than a single power supply operating at 100%. Typically, load conditions require a total power output wherein each power supply provides less than 50% of its full load capacity. This is even more problematic because each power supply is operating at less than 50% where efficiency degrades rapidly. The situation is even worse if there are more than two power supplies in parallel.

Conventional art addresses this problem by completely shutting down one of two redundant power supplies when only one power supply is needed or when using two power supplies in parallel is more inefficient than operating a single power supply. However, a problem with this solution is that by completely shutting down one of the redundant power supplies, the power supply that is shut down is typically unable to recover quickly enough in the event of a failure of the other power supply to prevent a momentary power failure in a system receiving power from the power supplies. For example, if the power supplies are providing power to a computer system, and one of the power supplies fails while the other is shut down, the computer system may experience errors or a complete failure before the redundant power supply is able to restart and begin providing power to the computer system.

In some embodiments, capacitors may be provided with the power supplies to continue to momentarily output power in the event of a failure or power interruption. However, if the capacitors are too small, there may not be a long enough hold-up time for a backup power supply to start up and begin providing power. Conversely, if the capacitors are too large, then too much time may be required to charge up the capacitors of a power supply being started up prior to providing power to a load before the voltage regulated by the power supplies sags to an unacceptable level.

Thus, there is a need for a redundant power supply system that allows the power supplies to operate at maximum efficiency while still providing quick redundancy fault recovery in the event of a failure of one of the power supplies.

SUMMARY OF THE INVENTION

From the foregoing discussion, it should be apparent that a need exists for an apparatus, system, and method that provide high efficiency redundant power supplies for power output less than about 50% of the capacity of the power supplies. Beneficially, such an apparatus, system, and method would increase the efficiency of redundant power supplies operated in parallel while still allowing for efficient fault recovery by providing redundancy protection and while meeting hold-up time requirements.

The present invention has been developed in response to the present state of the art, and in particular, in response to the problems and needs in the art that have not yet been fully solved by currently available redundant power supplies.

The apparatus includes a first power supply and a second power supply operated in parallel to provide power to a load wherein each power supply is configured to supply full power to the load in response to a failure of the other power supply and wherein each power supply comprises two or more power stages. The two or more power stages may include a primary stage and a regulator stage wherein the primary stage is configured to regulate voltage on an internal bus that serves as an input for the regulator stage. The regulator stage is configured to regulate voltage on a regulated bus connected to the load.

The apparatus also includes a power meter configured to detect an amount of power provided by the power supplies to the load and to determine if the provided power is below a predefined power threshold. A regulator control module is configured to control the operation of the regulator stages of the power supplies such that the regulator stage of the first power supply is shut down in response to the provided power falling below the predefined power threshold such that only the second power supply provides power to the load, and wherein the primary stage of the first power supply remains operational. A recovery module is also provided that is configured to start up the regulator stage of the first power supply in response to a failure of the second power supply such that the first power supply provides power to the load.

In one embodiment, the predefined power threshold is an amount of provided power that correlates to a minimum allowable efficiency of the power supplies operating in parallel. For example, the minimum allowable efficiency of the power supplies operating in parallel, in one embodiment, may include a minimum efficiency greater than about 85%. In another embodiment, the predefined power threshold may include 100% of a load capacity of one of the two power supplies such that the power supplies operating in parallel each supply about 50% of the power to the load. In a further embodiment, the predefined power threshold includes a hysteresis band with an upper limit and lower limit. In such an embodiment, the regulator module shuts down the regulator stage of the first power supply in response to the provided power falling below the lower limit, and the recovery module starts up the regulator stage of the regulator stage of the first power supply in response to the provided power rising above the upper limit.

In one embodiment, the recovery module is configured to start up the regulator stage of the first power supply in response to the provided power rising above the predefined power threshold. In an additional embodiment, the recovery module is configured to start up the regulator stage of the first power supply such that the first power supply provides power to the load within a predefined period of time. The predefined period of time being less than a start up time for both the regulator stage and the primary stage of the first power supply. In one embodiment, the load is an electrical device and the predefined period of time is configured such that power is provided to the electrical device prior to a shutdown of the electrical device. For example, in one embodiment, the predefined period of time is less than a holdup time, wherein the holdup time includes a minimum time after a failure wherein the regulated bus remains above a minimum acceptable voltage level.

The apparatus may also include an alternating module that starts up the regulator stage that is shut down by the regulator control module and shuts down the regulator stage that is providing power to the load in response to the power meter detecting that the provided power is below the predefined power threshold for a predetermined amount of time. In an additional embodiment, the alternating module causes the regulator module to alternate between shutting down the regulator stage of the first power supply and the regulator stage of the second power supply each time the provided power falls below the predefined threshold. The shutdown occurs after a regulator stage is restarted in response to the provided power rising above the predefined threshold.

In certain embodiments, the primary stage may be a boost stage configured to regulate the internal bus to a voltage greater than an input voltage provided to the boost stage. In alternate embodiments the primary stage may be a buck-type stage configured to regulate the internal bus to a voltage less than an input voltage provided to the buck stage.

A system and method of the present invention are also presented. The system and method in the disclosed embodiments substantially include the steps necessary to carry out the functions presented above with respect to the operation of the described apparatus.

The system, in one embodiment, includes an electrical device with a load that receives power from a first power supply and a second power supply and a regulated bus connected between the power supplies and the electrical device such that the regulated bus delivers power from the power supplies to the electrical device. The system includes a power meter configured to detect an amount of power provided by the power supplies to the load and to determine if the provided power is below a predefined power threshold. A regulator control module configured to control the operation of the regulator stages of the power supplies is also provided such that the regulator stage of the first power supply is shut down in response to the provided power falling below the predefined power threshold such that only the second power supply provides power to the load. The primary stage of the first power supply preferably remains operational. The system also includes a recovery module configured to start up the regulator stage of the first power supply in response to a failure of the second power supply such that the first power supply provides power to the load In further embodiments of the system, each power supply further comprises an input filter that rectifies an alternating current ("AC") input voltage and filters out harmonic content. In one embodiment, the input filter and the corresponding primary stage of a power supply comprise an active harmonic filter configured to provide approximately unity power factor correction and harmonic filtering.

In certain embodiments the electronic device may include two or more electronic devices connected to the regulated bus.

In additional embodiments, the system may include one or more additional power supplies operated in parallel to provide power to the load via the regulated bus. The regulator control module shuts down one or more regulator stages in response to the provided power falling below a predefined power threshold. The corresponding primary stages of the power supplies remain operational, and wherein the recovery module starts up one or more regulator stages previously shutdown by the regulator control module in response to failure of one or more power supplies.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
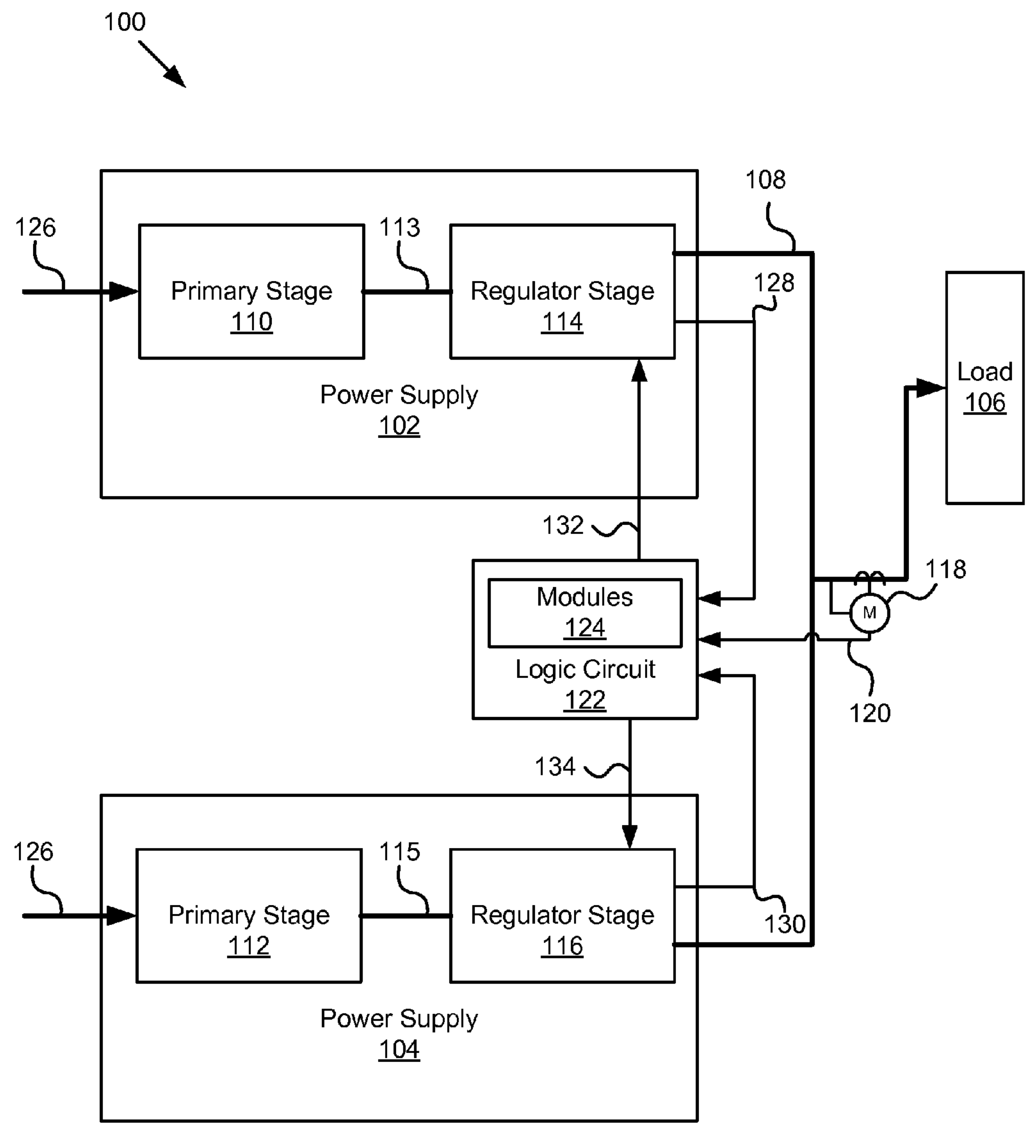
FIG. 1 is a schematic block diagram illustrating one embodiment of a system with redundant power supplies for providing increased power efficiency in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 with redundant power supplies 102 and 104 for providing increased efficiency power output in accordance with the present invention. The system 100 includes a first power supply 102 and a second power supply 104 for providing power to a load 106 via a regulated bus 108.

The power supplies 102 and 104 are preferably operated in parallel to provide power to the load 106 such that each power supply 102 and 104 is configured to supply full power to the load 106 in response to a failure of the other power supply 102 or 104. The power supplies 102 and 104 each include two or more power stages including a primary stage 110 or 112 and a regulator stage 114 or 116. The primary stages 110 and 112 are configured to regulate voltage on the internal buses 113 and 115 that serve as an input for the regulator stages 114 and 116 respectively. In one embodiment, the regulator stages 114 and 116 are configured to regulate voltage on the regulated bus 108 that is connected to and provides power to the load 106. In further embodiments, the system 100 may include one or more additional power supplies (not pictured) operated in parallel with the depicted power supplies 102 and 104 to provide power to the load 106 via the regulated bus 108.

The load 106, in various embodiments, may include one or more electrical devices or systems that receive power from the power supplies 102 and 104. For example, the load 106 may include devices such as a personal computer, a laptop, a server, a blade center, a router, a switch, an appliance, etc. In further embodiments, the load 106 may include subsystems of a larger system. For example, the load 106 may include a processor or a hard-disk drive of a computer system. One of skill in the art will recognize other loads 108 that may be supplied by the power supplies 102 and 104.

In one embodiment, a power meter 118 is configured to detect an amount of power provided by the power supplies 102 and 104 to the load 106 and to determine if the provided power is below a predefined threshold. In additional embodiments, the power meter 118 could be implemented at the input or at an intermediate stage of the power supplies 102 and 104. The power meter 118 may also be implemented to measure power via a current transformer, current through an inductor, current through a resistor, etc., or numerous other ways as will be recognized by one of skill in the art. The power meter 118, in one embodiment, provides a power signal 120 back to a logic circuit 122. The logic circuit 122 includes a plurality of modules 124 for implementing the logic necessary to control the operation of the power supplies 102 and 104 in response to receiving the power signal 120 from the power meter 118 as is discussed in detail below.

The primary stages 110 and 112 receive an input voltage 126. In one embodiment, the input voltage 126 is preferably an alternating current ("AC") voltage 126 such as that provided by a common 110 volt or 220 volt wall outlet. In various embodiments, the input voltage 126 may be provided by different means such as a power cord or a rack system. In some embodiments, the input voltage 126 is a direct current ("DC") voltage. The DC voltage, in one embodiment, may be provided by an external power inverter that converts AC power into DC power.

The system 100, in another embodiment, may include an input filter that rectifies the AC input voltage 126 and filters out harmonic content. In a further embodiment, the input filter and the primary stages 110 and 112 may comprise an active harmonic filter configured to provide approximately unity power factor correction and harmonic filtering. In another embodiment, the primary stages 110 and 112 may be implemented as boost stages, or a similar boost-type topology, configured to regulate the internal buses 113 and 115 to a voltage greater than the input voltage provided to the primary stages 110 and 112. In an alternate embodiment, the primary stages 110 and 112 may be implemented as buck stages, or similar buck-type topology, configured to regulate the internal buses 113 and 115 to a voltage less than the input voltage provided to the primary stages 110 and 112. Of course, the primary stages 110 and 112 may also be implemented as various additional types of power supply stages as will be recognized by one of skill in the art.

The primary stages 110 and 112 provide as an output a regulated voltage on an internal bus 113 or 115 that serves as an input for the regulator stages 114 and 116. For example, the primary stages 110 and 112 may provide a constant direct current ("DC") voltage, such as 400 volts, to the regulator stages 114 and 116. The regulator stages 114 and 116 are typically configured to receive the regulated voltage from the primary stages 110 and 112 respectively, and regulate an output voltage on the regulated bus 108 to provide one or more voltages to the load 106. For example, the regulator stages 114 and 116 may provide a 12 volt DC supply to the load 106. In a further embodiment, the regulator stages 114 and 116 may provide multiple voltage supplies to the load 106 such as 12 V, 5 V, 3.3 V and −12 V.

In one embodiment, the regulator stages 114 and 116 provide an output signal 128 and 130 respectively to the logic circuit 122. In the embodiment, the output signals 128 and 130 indicate to the logic circuit 122 whether or not a regulator module 114 or 116 is currently turned on. For example, the output signal 128 may provide a '1' or a 'high' value to indicate that the regulator stage 114 is turned on, and the output signal 128 may provide a '0' or a 'low' value to indicate that the regulator stage 114 is shut down. The output signal 130 may operate in the same manner.

Thus, in one embodiment, the logic circuit 122 receives a power signal 120 from the power meter 118, receives an output signal 128 from the first regulator stage 114, and receives an output signal 130 from the second regulator stage 116. The logic circuit 122 includes the logic necessary to control the operation of the regulator stages 114 and 116 via modules 124 such that the regulator stages may be started up or shut down in order to increase the power efficiency of the system 100 without turning on or turning off an entire power supply 102 and 104. For example, if the logic circuit 122 detects that the power signal 120 from the power meter 118 indicates that the power supplies 102 and 104 are operating at below a predefined threshold, such as below 50% of full load capacity of the power supplies 102 and 104, and the output signals 128 and 130 from the regulator stages 114 and 116 indicate that both regulator stages 114 and 116 are turned on, then the logic circuit 122 may send a power control signal 132 or 134 to shut down one of the regulator stages 114 or 116 in order to increase efficiency.

Subsequently, if the power signal 120 indicates that the power supplies 102 and 104 begin operating at above the predefined threshold or need more power than can be provided by a single power supply 102 or 104, then the logic circuit 122 may send a power control signal 132 or 134 to re-start the shut down regulator stage 114 or 116.

By turning off only the regulator stage 114 or 116 of one power supply 102 or 104, the system 100 is able to continue to provide redundancy fault protection, because the power supply 102 or 104 with the shut down regulator stage 114 or 116 is able to quickly recover and provide power to the load 106 in the event of a failure of the other power supply 102 or 104. This is because the corresponding primary stage 110 or 112 remains on and continues to regulate the internal bus 113 or 115 of the power supplies 102 or 104 such that only the regulator stages 114 or 116 need to be started up in order to provide power to the load 106. The power supplies 102 and 104 may include a capacitor on the internal buses 113 and 115 between the primary stages 110 and 112 and the regulator stages 114 and 116. By keeping the primary stage 110 or 112 of a shutdown power supply 102 or 104 operating, the capacitor is continually charged by the primary stage 110 or 112 such that the power supply 102 or 104 can quickly begin providing power to the load 106 without re-charging the capacitor. Thus, in the event of a failure of one power supply 102 or 104, the other power supply 102 or 104, can quickly start up and begin providing power to the load 106, because the capacitor is already charged.

For example, if one regulator stage 116 is shut down because of a drop in power below the predefined threshold, then the corresponding power supply 104 no longer provides power to the load 106, but instead all of the power would be provided by the other power supply 102. However, if the operating power supply 102 fails, the logic circuit 122 immediately causes the shut down regulator stage 116 to turn on again and begin providing power to the load 106. Because the corresponding primary stage 112 was not shut down, the power supply 104 can very quickly provide power to the load 106, so that the computer system or electrical device that is the load 106 is able to continue operating without a significant power interruption.

In a redundant power system 100 with two power supplies 102 and 104, each power supply 102 or 104 typically operates most efficiently when they each carry some minimum amount of its full load capacity. Having a 50% minimum efficient load capacity is desirable because that is the maximum power output capacity for a single power supply 102 or 104 when not operating in parallel. However, in some systems, load conditions may require a total power output wherein each power supply 102 and 104 provides less than its minimum efficient load capacity. This is problematic because the peak efficiency of a power supply 102 or 104 typically occurs when it is operating at about 50% of its full load capacity, but the efficiency is drastically lower when the power supply 102 or 104 is lightly loaded. Therefore, the predetermined threshold may be set to turn off one of the regulator stages 114 or 116 when the power supplies 102 and 104 operate below 50% of their full load capacity, because that is the point at which efficiency most dramatically decreases. Of course, depending on the design of the power supplies 102 and 104, the optimal point at which to set the threshold may vary above or below point of 50% full load capacity.

In various embodiments, the predefined threshold at which one of the regulator stages 114 or 116 is shut down may be determined according to the efficiency curve of the power supplies 102 and 104 operating in parallel. Thus, the predefined power threshold may be an amount of provided power detected by the power meter 118 that correlates to a minimum allowable efficiency of the power supplies 102 and 104 operating in parallel. For example, in one embodiment, the minimal allowable efficiency may occur at about 85% efficiency, which may also correlate to the point at which the power supplies 102 and 104 operate at 50% full load capacity.

In at least one embodiment, the predefined power threshold may include a hysteresis band with an upper limit and a lower limit. Thus, one of the regulator stages 114 or 116 may be shut down in response to the power detected by the power meter 118 falling below the lower limit, and the shutdown regulator stage 114 or 116 may be re-started in response to the detected power rising above the upper limit. Such a hysteresis band might prevent the constant switching on and off of a regulator stage 114 or 116.

Figure 2:
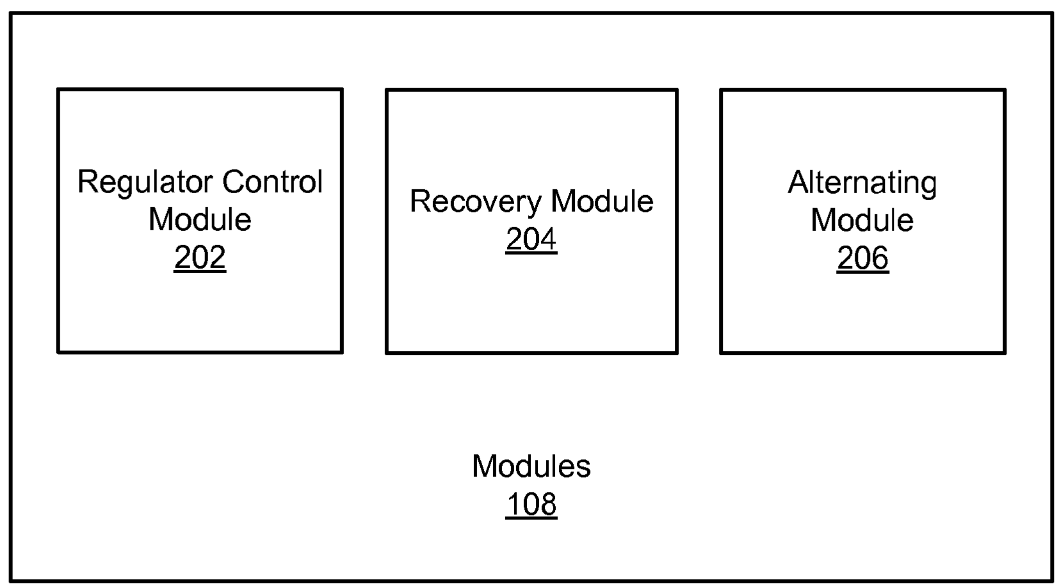
FIG. 2 is a schematic block diagram illustrating one embodiment of a plurality of modules for controlling the operation of two redundant power supplies in accordance with the present invention.

FIG. 2 is a schematic block diagram illustrating one embodiment of a plurality of modules 124 for controlling the operation of two redundant power supplies 102 and 104 in accordance with the present invention. In one embodiment, the modules 124 include a regulator control module 202, a recovery module 204, and an alternating module 206.

The regulator control module 202 is preferably configured to control the operation of the regulator stages 114 and 116 of the power supplies 102 and 104 respectively such that the regulator stage 114 of the first power supply 102 is shut down in response to the provided power on the regulated bus 108 falling below the predefined power threshold. The regulator control module 202 allows the second power supply 104 to provide all of the power to the load 106 when the regulator stage 114 of the first power supply 102 is shut down. The regulator control module 202 also allows the primary stage 110 of the first power supply 102 to remain operational such that only the regulator stage 114 needs to be re-started before the power supply 102 can again provide power 108 to the load 106.

The regulator control module 202, in one embodiment, processes the power signal 120 from the power meter 118 and the output signals 128 and 130 from the regulator stages 114 and 116 to determine if power provided by the power supplies 102 and 104 has fallen below the predetermined threshold. Then, the regulator control module 202 sends a control signal 132 or 134 to one of the regulator stages 114 and 116 to shutdown one of the regulator stages 114 or 116 if necessary to improve efficiency.

The recovery module 204, in one embodiment, is configured to start up the regulator stage 114 of the first power supply 102 in response to a failure of the second power supply 104 such that the first power supply 102 provides power to the load 106. In a further embodiment, the recovery module 204 is configured to start up the shutdown regulator stage 114 of the first power supply 102 in response to the provided power 108 rising above the predefined threshold. Like the regulator control module 202, the recovery module 204 may utilize the power signal 120 and output signals 128 and 130 to determine whether or not to start up or re-start one of the regulator stages 114 or 116.

In one embodiment, the recovery module 204 is configured to start up the regulator stage 114 of the first power supply 102 such that the first power supply 102 provides power to the load 106 within a predefined period of time. In one embodiment, the predefined period of time is less than a start up time for the power supply 102 where both the primary stage 110 and the regulator stage 114 need to be restarted. In other words, because only the regulator stage 114 is shut down and because the primary stage 110 is left running, the predefined period of time may be less than the amount of time required to restart the entire power supply 102.

In a preferred embodiment, the predefined period of time is less than a hold-up time of the power supplies 102 and 104. This preferable so that the shutdown regulator stage 114 typically restarts before the voltage of the regulated bus 108 to fall below a lower limit. For example, if the operating power supply 104 loses input power 126 or its primary stage 112 fails and a capacitor on the internal bus 115 is sized to provide power for a specified hold-up time, the regulator stage 114 that has been shut down restarts before the internal bus 115 of the failed power supply 104 sags enough to cause the regulated voltage to fall below a lower voltage limit. In another example, if a capacitor on the regulated bus 108 is sized to provide a required holdup time, the regulator stage 114 that has been shut down can again restart quickly before the regulated bus 108 voltage sags below a lower voltage limit.

In one embodiment, the load 106 may be caused by an electrical device, and the predefined period of time may be configured such that power is provided to the electrical device prior to a shutdown of the electrical device. Thus, the redundant protection of the power supplies 102 and 104 is preserved, even though the regulator stage 114 or 116 of one of the power supplies 102 or 104 is shut down, because the recovery module 204 allows the shut down regulator stage 114 or 116 to quickly recover and begin providing power to the load 106. In some embodiment, the predefined period of time may be less than about 1 millisecond.

The alternating module 206, in one embodiment, starts up a regulator stage 114 that has been shut down by the regulator control module 202, and shuts down the regulator stage 116 that has been providing power to the load 106. In the embodiment, the alternating module 206 detects that the provided power has remained below the predefined threshold for a predetermined period of time, and thus one of the power supplies 102 or 104 has been operating for the predetermined amount of time. The alternating module 206 may begin alternating the load 106 between the power supplies 102 and 104 while the power provided by the power supplies 102 and 104 remains below the predefined threshold. For example, if the power supplies 102 and 104 are operated below the predefined threshold for a prolonged period of time, the alternating module 206 may periodically start up and shut down the regulator stages 114 and 116 of the power supplies 102 and 104 such that the load 106 is periodically switched from one power supply 102 or 104 to the other. In this manner, operation can be evenly distributed to prevent excessive wear on one power supply 102 or 104.

In another embodiment, the alternating module 206 alternates which regulator stage 114 or 116 is shut down when the power meter 118 determines power supplied to the load 106 is below the minimum allowable threshold. In the embodiment, each time the regulator module 202 determines that the provided power is below the predefined threshold, the alternating module 206 cooperates with the regulator control module 202 to alternate which regulator stage 114, 116 is shut down. For example, if the regulator control module 202 determines that the provided power is below the predefined threshold, the alternating module 206 may cooperate with the regulator control module 202 to shut down the regulator stage 116 of the second power supply 104. Once the provided power rises above the predefined threshold and the recovery module 204 starts up the regulator stage 116 of the second power supply 104, the next time that the regulator control module 202 determines that the provided power dips below the predefined threshold the alternating module 206 cooperates with the regulator control module 202 to shut down the regulator stage 114 of the first power supply 102. In another embodiment, the alternating module 206 alternates shutting down regulator stages 114, 116 after each crossing of the predefined threshold and after the provided power remains below the predefined threshold for a prolonged period of time.

In further embodiments, the modules 124 may be configured to control more than two power supplies operated in parallel to provide power to the load 106. In such embodiments, the regulator control module 202 may be configured to shut down one or more regulator stages of one or more power supplies in response to the provided power falling below a predefined threshold, and the corresponding primary stages of the one or more power supplies remain operational. Furthermore, the recovery module 204 may start up one or more regulator stages, previously shutdown by the regulator control module 202 in response to a failure of one of the power supplies. In yet a further embodiment, the alternating module 206 may be configured to periodically to start up and shutdown multiple additional regulator stages from multiple additional power supplies such that the load 106 is shared over time between all of the power supplies. For example, if three power supplies are operated in parallel, two predetermined thresholds may be used so that at an upper predefined threshold, one regulators stage 114 is shut down and at the lower predefined threshold another regulator stage 116 is shut down. The regulator stages 114, 116 may then be restarted in sequence as the provided power crosses each threshold. In another example, one predefined threshold is used and one or more regulator stages are shutdown and then subsequently restarted as power crosses the single predefined threshold.

Figure 3:
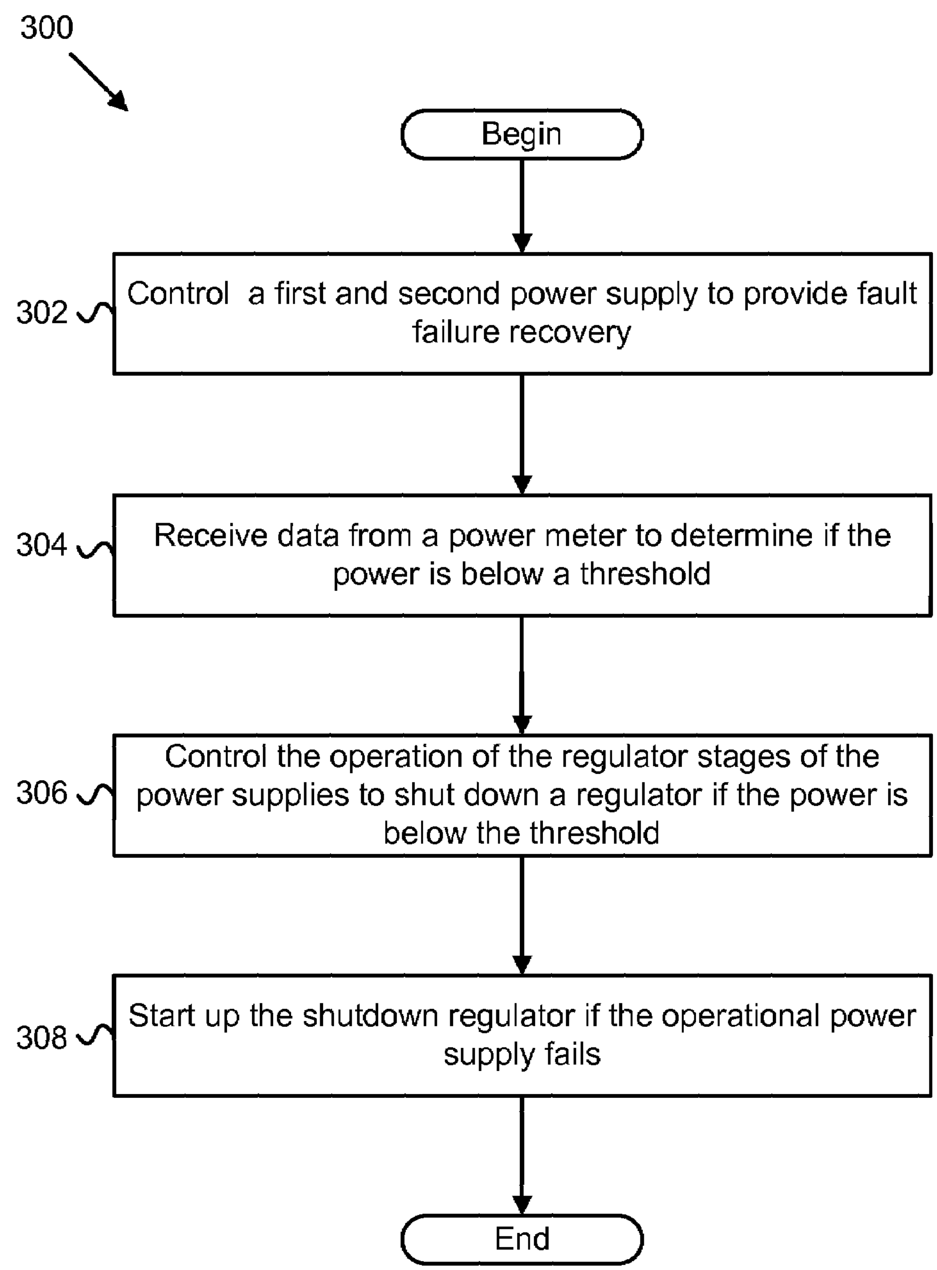
FIG. 3 is a schematic flow chart diagram illustrating one embodiment of a method for providing redundant power supplies with increased power efficiency in accordance with the present invention.

FIG. 3 is a schematic flow chart diagram illustrating one embodiment of a method 300 for providing redundant power supplies 102 and 104 with increased power efficiency in accordance with the present invention. The method 300 begins by utilizing a logic circuit 122 to control 302 a first power supply 102 and a second power supply 104 operated in parallel to provide power to a load 106 such that each power supply 102 or 104 supplies full power to the load 106 in response to a failure of the other power supply 102 or 104.

Next, data is received 304 from a power meter 118 configured to detect an amount of power provided by the power supplies 102 and 104 to the load 106. The data may be used to determine if the provided power is below a predefined threshold. Typically, the predefined threshold indicates an amount of provided power that correlates to a minimum allowable efficiency of the power supplies 102 and 104 operating in parallel.

The regulator control module 202 controls 306 the operation of the regulator stages 114 and 116 of the power supplies 102 and 104 such that the regulator stage 114 of the first power supply 102 is shut down in response to the provided power falling below the predefined threshold so that only the second power supply 104 provides power to the load 106 and wherein the primary stage 110 of the first power supply 102 remains operational.

Finally, the recovery module 204 starts up 308 the regulator stage 114 of the first power supply 102 such that the first power supply 102 again provides power to the load 106. The recovery module 204 restarts the shut down regulator stage 114 in response to the power detected by the power meter 118 rising above the predefined threshold or in response to a failure of the second power supply 104 and the method 300 ends.

Figure 4:
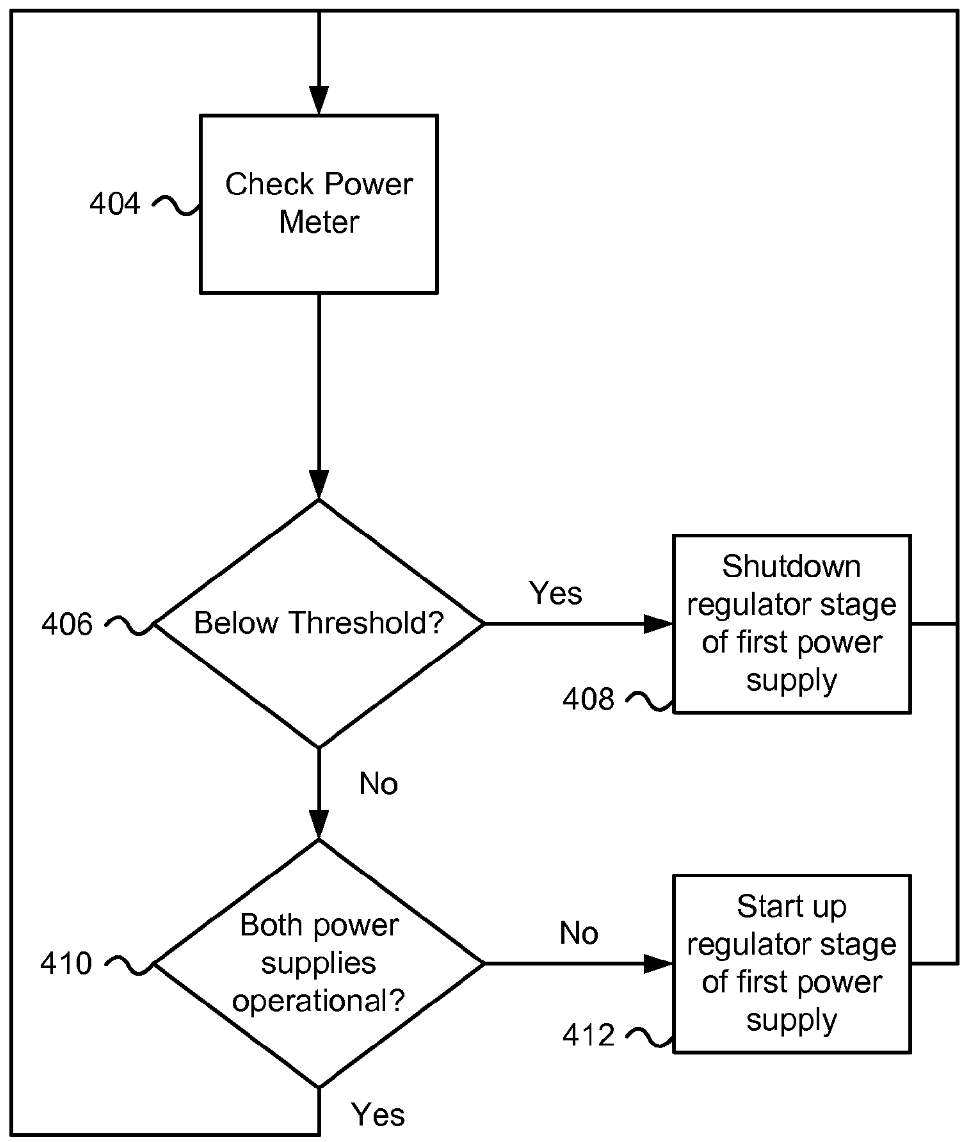
FIG. 4 is a schematic flow chart diagram illustrating an additional embodiment of a method for providing redundant power supplies with increased power efficiency in accordance with the present invention.

FIG. 4 is a schematic flow chart diagram illustrating an additional embodiment of a method 400 for providing redundant power supplies 102 and 104 with increased power efficiency in accordance with the present invention.

The method 400 begins by checking 404 the power meter 118 to measure the power consumed by the load 106. The power meter 118, in one embodiment, provides a power signal 120 to the logic circuit 122 that indicates the amount of power consumed by the load 106. The logic circuit 122 utilizes the modules 124 to determine actions to be taken in the control of the regulation stages 114 and 116. The regulator control module 202 determines 406 if the provided power is below a predefined threshold.

If the regulator module 202 determines that the provided power is below the predefined threshold, the regulator control module 202 shuts down 408 the regulator stage 114 of the first power supply 102. Then, the method 400 returns by checking 404 the power meter 118 and measuring the provided power.

If the regulator module 202 determines 406 that the provided power is not below the predefined threshold, the regulator module 202 determines 410 if both the power supplies 102 and 104 are operational. In one embodiment, the logic circuit 122 receives output signals 128 and 130 from the power supplies 102 and 104 respectively that indicate whether or not the regulator stages 114 and 116 of the power supplies 102 and 104 are currently operational.

If the regulator module 202 determines that one of the power supplies 102 or 104 is not currently operational, then the recovery module 204 starts up 412 the previously shutdown regulator stage 114 of the first power supply 102., and the method 400 returns to checking 404 the power meter 118 to measure the provided power. If the regulator module 202 determines that both power supplies 102 and 104 are already operational, then the method 400 returns to checking the power meter 118 to measure the provided power.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:

a first power supply and a second power supply operated in parallel to provide power to a load wherein each power supply is configured to supply full power to the load in response to a failure of the other power supply and wherein each power supply comprises two or more power stages, the two or more power stages comprising a primary stage and a regulator stage, the primary stage configured to regulate voltage on an internal bus that serves as an input for the regulator stage, the regulator stage configured to regulate voltage on a regulated bus connected to the load;

a power meter configured to detect an amount of power provided by the power supplies to the load and to determine if the provided power is below a predefined power threshold;

a regulator control module configured to control the operation of the regulator stages of the power supplies such that the regulator stage of the first power supply is shut down in response to the provided power falling below the predefined power threshold such that only the second power supply provides power to the load and wherein the primary stage of the first power supply remains operational; and a recovery module configured to start up the regulator stage of the first power supply in response to a failure of the second power supply such that the first power supply provides power to the load.

2. The apparatus of claim 1, wherein the predefined power threshold is an amount of provided power that correlates to a minimum allowable efficiency of the power supplies operating in parallel.

3. The apparatus of claim 1, wherein the predefined power threshold comprises 100% of a load capacity of one of the two power supplies such that the power supplies operating in parallel each supply about 50% of the power to the load.

4. The apparatus of claim 1, wherein the recovery module is further configured to start up the regulator stage of the first power supply in response to the provided power rising above the predefined power threshold.

5. The apparatus of claim 4, further comprising an alternating module that causes the regulator module to alternate between shutting down the regulator stage of the first power supply and the regulator stage of the second power supply each time the provided power falls below the predefined threshold, a shutdown occurring after a regulator stage is restarted in response to the provided power rising above the predefined threshold.

6. The apparatus of claim 1, wherein the predefined power threshold comprises a hysteresis band with an upper limit and lower limit, and wherein the regulator module shuts down the regulator stage of the first power supply in response to the provided power falling below the lower limit, and wherein the recovery module starts up the regulator stage of the regulator stage of the first power supply in response to the provided power rising above the upper limit.

7. The apparatus of claim 1, wherein the recovery module is configured to start up the regulator stage of the first power supply such that the first power supply provides power to the load within a predefined period of time, the predefined period of time being less than a start up time for both the regulator stage and the primary stage of the first power supply.

8. The apparatus of claim 7, wherein the load is an electrical device and wherein the predefined period of time is configured such that power is provided to the electrical device prior to a shutdown of the electrical device.

9. The apparatus of claim 7, wherein the predefined period of time is less than a holdup time, wherein the holdup time comprises a minimum time after a failure wherein the regulated bus remains above a minimum acceptable voltage level.

10. The apparatus of claim 1, further comprising an alternating module that starts up the regulator stage that is shut down by the regulator control module and shuts down the regulator stage that is providing power to the load in response to the power meter detecting that the provided power is below the predefined power threshold for a predetermined amount of time.

11. The apparatus of claim 1, wherein the primary stage is a boost stage configured to regulate the internal bus to a voltage greater than an input voltage provided to the boost stage.

12. The apparatus of claim 1, wherein the primary stage is a buck stage configured to regulate the internal bus to a voltage less than an input voltage provided to the buck stage.

13. A system comprising:

an electrical device comprising a load that receives power from a first power supply and a second power supply;

a regulated bus connected between the power supplies and the electrical device such that the regulated bus delivers power from the power supplies to the electrical device;

the first power supply and second power supply operated in parallel to provide power to the load wherein each power supply is configured to supply full power to the load in response to a failure of the other power supply and wherein each power supply comprises two or more power stages, the two or more power stages comprising a primary stage and a regulator stage, the primary stage configured to regulate voltage on an internal bus that serves as an input for the regulator stage, the regulator stage configured to regulate voltage on the regulated bus connected to the electrical device;

a power meter configured to detect an amount of power provided by the power supplies to the load and to determine if the provided power is below a predefined power threshold;

a regulator control module configured to control the operation of the regulator stages of the power supplies such that the regulator stage of the first power supply is shut down in response to the provided power falling below the predefined power threshold such that only the second power supply provides power to the load and wherein the primary stage of the first power supply remains operational; and a recovery module configured to start up the regulator stage of the first power supply in response to a failure of the second power supply such that the first power supply provides power to the load.

14. The system of claim 13, wherein each power supply further comprises an input filter that rectifies an alternating current ("AC") input voltage and filters out harmonic content.

15. The system of claim 14, wherein the input filter and the corresponding primary stage of a power supply comprise an active harmonic filter configured to provide approximately unity power factor correction and harmonic filtering.

16. The system of claim 13, wherein the electronic device comprises two or more electronic devices connected to the regulated bus.

17. The system of claim 14, further comprising one or more additional power supplies operated in parallel to provide power to the load via the regulated bus wherein the regulator control module shuts down one or more regulator stages in response to the provided power falling below a predefined power threshold, wherein the corresponding primary stages of the power supplies remain operational, and wherein the recovery module starts up one or more regulator stages, previously shutdown by the regulator control module, in response to failure of one or more power supplies.

18. A method for controlling a power supply system, the method comprising:

controlling a first power supply and a second power supply operated in parallel to provide power to a load wherein each power supply is configured to supply full power to the load in response to a failure of the other power supply and wherein each power supply comprises two or more power stages, the two or more power stages comprising a primary stage and a regulator stage, the primary stage configured to regulate voltage on an internal bus that serves as an input for the regulator stage, the regulator stage configured to regulate voltage on a regulated bus connected to the load;

receiving data from a power meter configured to detect an amount of power provided by the power supplies to the load and to determine if the provided power is below a predefined power threshold;

controlling the operation of the regulator stages of the power supplies such that the regulator stage of the first power supply is shut down in response to the provided power falling below the predefined power threshold such that only the second power supply provides power to the load and wherein the primary stage of the first power supply remains operational; and starting up the regulator stage of the first power supply in response to a failure of the second power supply such that the first power supply provides power to the load.

19. The method of claim 18, wherein the predefined power threshold is an amount of provided power that correlates to a minimum allowable efficiency of the power supplies operating in parallel.

20. The method of claim 18, wherein the recovery module is further configured to start up the regulator stage of the first power supply in response to the provided power rising above the predefined power threshold.

* * * * *